US010744409B2

(12) United States Patent
Zhang et al.

(10) Patent No.: US 10,744,409 B2
(45) Date of Patent: Aug. 18, 2020

(54) METHOD, APPARATUS, AND STORAGE MEDIUM FOR DISPLAYING GAME DATA ON A DESKTOP OF A MOBILE TERMINAL

(71) Applicant: TENCENT TECHNOLOGY (SHENZHEN) COMPANY LIMITED, Shenzhen (CN)

(72) Inventors: Zhipeng Zhang, Shenzhen (CN); Tao Sun, Shenzhen (CN); Huihao Xing, Shenzhen (CN); Bo Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 45 days.

(21) Appl. No.: 15/847,016

(22) Filed: Dec. 19, 2017

(65) Prior Publication Data

US 2018/0104588 A1 Apr. 19, 2018

Related U.S. Application Data

(63) Continuation of application No. PCT/CN2016/105334, filed on Nov. 10, 2016.

(30) Foreign Application Priority Data

Nov. 18, 2015 (CN) .......................... 2015 1 0799577

(51) Int. Cl.
*A63F 13/52* (2014.01)
*G06F 3/14* (2006.01)
(Continued)

(52) U.S. Cl.
CPC ............ *A63F 13/52* (2014.09); *A63F 13/332* (2014.09); *A63F 13/533* (2014.09); *A63F 13/92* (2014.09);
(Continued)

(58) Field of Classification Search
CPC ...................................................... A63F 13/52
See application file for complete search history.

(56) References Cited

U.S. PATENT DOCUMENTS

2007/0162850 A1* 7/2007 Adler ...................... G06F 9/451
715/700
2007/0287431 A1* 12/2007 Verna ................. H04M 1/72544
455/414.1

(Continued)

FOREIGN PATENT DOCUMENTS

CN 1949710 A 4/2007
CN 102546777 A 7/2012
(Continued)

OTHER PUBLICATIONS

The World Intellectual Property Organization (WIPO) International Search Report for PCT/CN2016/105334 dated Feb. 7, 2017 6 Pages (including translation).

(Continued)

*Primary Examiner* — Omkar A Deodhar
*Assistant Examiner* — Shauna-Kay Hall
(74) *Attorney, Agent, or Firm* — Anova Law Group, PLLC

(57) ABSTRACT

Method, apparatus, and storage medium for displaying data are provided. The method includes: obtaining game data of a game application running on a mobile terminal via a first application and displaying the game data in a desktop plug-in corresponding to the first application. The game data includes one or more of: a game event and an event time corresponding to the game event. The desktop plug-in is displayed on a desktop of the mobile terminal.

20 Claims, 7 Drawing Sheets

(51) Int. Cl.

| | | |
|---|---|---|
| G06F 9/44 | (2018.01) | |
| G06F 9/445 | (2018.01) | |
| G09G 5/14 | (2006.01) | |
| A63F 13/533 | (2014.01) | |
| A63F 13/332 | (2014.01) | |
| A63F 13/92 | (2014.01) | |
| G06F 3/0488 | (2013.01) | |

(52) U.S. Cl.
CPC ............ *G06F 3/04883* (2013.01); *G06F 3/14* (2013.01); *G06F 9/44* (2013.01); *G06F 9/44526* (2013.01); *G09G 5/14* (2013.01); *G09G 2340/10* (2013.01)

(56) References Cited

U.S. PATENT DOCUMENTS

| | | | | |
|---|---|---|---|---|
| 2010/0248841 | A1* | 9/2010 | Hsiao | A63F 13/12 463/42 |
| 2012/0081287 | A1* | 4/2012 | Kim | G06F 9/44 345/168 |
| 2012/0210348 | A1* | 8/2012 | Verna | H04N 5/781 725/25 |
| 2012/0302342 | A1* | 11/2012 | Alderucci | G07F 17/32 463/31 |
| 2013/0275531 | A1* | 10/2013 | Hahm | H04W 4/12 709/206 |
| 2014/0129682 | A1* | 5/2014 | Lin | H04L 67/02 709/219 |
| 2015/0058730 | A1 | 2/2015 | Dubin et al. | |
| 2015/0212811 | A1 | 7/2015 | Miller et al. | |
| 2015/0326652 | A1* | 11/2015 | Davis | H04L 67/104 709/204 |
| 2016/0357420 | A1* | 12/2016 | Wilson | G06F 3/04847 |
| 2017/0099592 | A1* | 4/2017 | Loeb | H04L 67/303 |

FOREIGN PATENT DOCUMENTS

| | | |
|---|---|---|
| CN | 102647398 A | 8/2012 |
| CN | 102968559 A | 3/2013 |
| CN | 103944922 A | 7/2014 |
| CN | 105468321 A | 4/2016 |

OTHER PUBLICATIONS

The State Intellectual Property Office of the People's Republic of China (SIPO) Office Action 1 for 201510799577.8 dated Mar. 20, 2019 8 Pages (including translation).

The State Intellectual Property Office of the People's Republic of China (SIPO) Office Action 1 for 201510799577.8 dated Dec. 2, 2019 9 Pages (including translation).

\* cited by examiner

US 10,744,409 B2

METHOD, APPARATUS, AND STORAGE MEDIUM FOR DISPLAYING GAME DATA ON A DESKTOP OF A MOBILE TERMINAL

RELATED APPLICATIONS

This application is a continuation application of PCT Patent Application No. PCT/CN2016/105334, filed on Nov. 10, 2016, which claims priority to Chinese Patent Application No. 201510799577.8, filed with the Chinese Patent Office on Nov. 18, 2015 and entitled "DATA DISPLAY METHOD AND DATA DISPLAY APPARATUS", all of which is incorporated herein by reference in their entirety.

FIELD OF THE TECHNOLOGY

The present disclosure generally relates to the field of computers, and more particularly, relates to a method, apparatus, and storage medium for displaying data.

BACKGROUND OF THE DISCLOSURE

Nowadays, more users start to play online games. It is desirable for these users to timely receive game data, such as game activity notifications, related to the online games. As such, how to push the game data to the user with optimized display effect becomes a problem that needs to be immediately resolved for the users.

A commonly-used data display method includes mixing game information with other information messages, and pushing and displaying the mixed messages to a user. Due to complexity in types and contents of such information, the user may easily miss out important game information, which disturbs the user for playing online games. That is, display effect of conventional data display methods for displaying game data needs to be improved.

There is thus a need to provide a method, apparatus, and storage medium for displaying data to effectively improve displaying of game data to users.

SUMMARY

One aspect of the present disclosure provides a data display method, including: obtaining game data of a game application running on a mobile terminal via a first application, the game data including one or more of: a game event and an event time corresponding to the game event; and displaying the game data in a desktop plug-in corresponding to the first application, the desktop plug-in being displayed on a desktop of the mobile terminal.

Another aspect of the present disclosure provides a data display apparatus, including: a memory, storing program instructions for a data display method, and a processor, coupled to the memory and, when executing the program instructions, configured to: obtain game data of a game application running on a mobile terminal via a first application, the game data including one or more of: a game event and an event time corresponding to the game event; and display the game data in a desktop plug-in corresponding to the first application, the desktop plug-in being displayed on a desktop of the mobile terminal.

Another aspect of the present disclosure provides a non-transitory computer-readable storage medium containing computer-executable program instructions for, when executed by a processor, performing a data display method, the method including: obtaining game data of a game application running on a mobile terminal via a first application, the game data including one or more of: a game event and an event time corresponding to the game event; and displaying the game data in a desktop plug-in corresponding to the first application, the desktop plug-in being displayed on a desktop of the mobile terminal.

BRIEF DESCRIPTION OF THE DRAWINGS

The accompanying drawings described herein are used for providing further understanding for the present invention and constitute a part of this application. Exemplary embodiments of the present disclosure are used for explaining the present disclosure and do not constitute an improper limitation to the scope of the present disclosure. In the accompanying drawings.

DESCRIPTION OF EMBODIMENTS

To make a person skilled in the art better understand solutions of the present disclosure, the following clearly and completely describes the technical solutions in various embodiments of the present disclosure with reference to the accompanying drawings. Apparently, the described embodiments are a part rather than all of the embodiments of the present disclosure. All other embodiments obtained by a person of ordinary skill in the art based on the embodiments of the present disclosure without creative efforts shall fall within the protection scope of the present disclosure.

It should be noted that in the specification, claims, and accompanying drawings of the present disclosure, the terms "first", "second", and so on are intended to distinguish between different objects without indicating a specific order. It should be understood that data used in this way may exchange in appropriate cases, so that the embodiments of the present disclosure described herein can be implemented in a sequence except those shown or described herein. Moreover, the terms "include", "contain" and any other variants mean to cover the non-exclusive inclusion. For example, a process, method, system, product, or device that includes a list of steps or units is not necessarily limited to those steps or units, but may include other steps or units not expressly listed or inherent to such a process, method, product, or device.

Embodiments of the present disclosure provide method, apparatus, and storage medium for displaying data to at least resolve the technical problems including poor display effect for displaying data, such as game data, to users.

Figure 1:
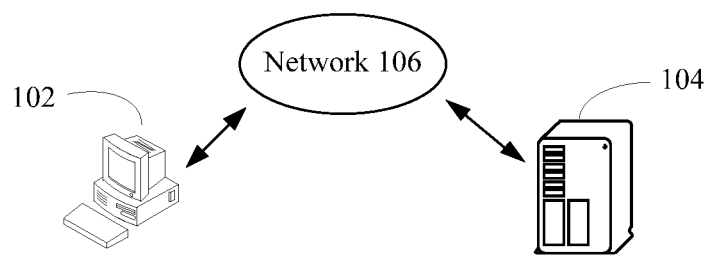
FIG. 1 is a schematic diagram of an application scenario of an exemplary data display method according to various embodiments of the present disclosure.

In various embodiments, the data display methods may be applied to any suitable application environment, such as that shown in FIG. 1.

As shown in FIG. 1, a mobile terminal 102 obtains game data, e.g., to-be-displayed game data, for a game application running on the mobile terminal 102, from an application server 104 configured with a first application, via a network 106. The mobile terminal 102 then displays the obtained game data in a desktop plug-in corresponding to the first application.

Optionally, the network may include, but be not limited to: a wide area network, a metropolitan area network, and a local area network. Optionally, the mobile terminal may include, but be not limited to, a mobile phone, tablet computer, and/or a laptop computer.

Figure 2:
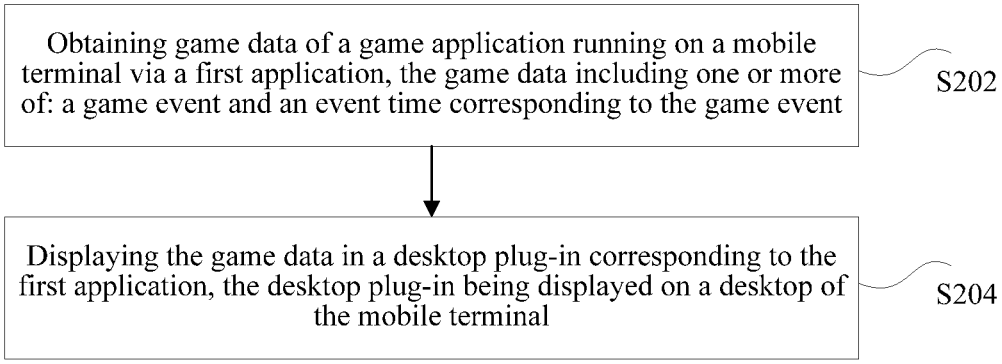
FIG. 2 is a flowchart of an exemplary data display method according to various embodiments of the present disclosure.

FIG. 2 illustrates an exemplary data display method according to various embodiments of the present disclosure. As shown in FIG. 2, the method includes the following.

In S202: obtaining game data of a game application running on a mobile terminal via a first application, the game data including one or more of: a game event and an event time corresponding to the game event.

In S204: displaying the game data in a desktop plug-in corresponding to the first application, the desktop plug-in being displayed on a desktop of the mobile terminal.

Optionally, the data display method may be used in a process that game data in a game application (such as a phone game) is displayed on the desktop of the mobile terminal. For example, with reference to FIG. 1, the to-be-displayed game data of the game application that runs on the mobile terminal 102 and that is obtained by the application server 104 is displayed in the desktop plug-in corresponding to the first application, to avoid a problem of a relatively poor display effect caused by mixing the game data with other data for display on the mobile terminal 102, so as to accurately and timely prompt the game data of the game application that is run by a user of the mobile terminal. Further, the game data is displayed in the desktop plug-in separately, such that the displayed game data will not disturb the user of the mobile terminal, which improves user experience.

A typical data display method includes: mixing game data with other messages and pushing the game data and other messages to a user by using a message center for display. For example, an activity notification in the game application and information such as real-time news and a session notification of an instant messaging application are mixed and are pushed and displayed to the user by using a message box of the mobile terminal (such as a mobile phone). Apparently, when there is a large amount of to-be-displayed data content, a game player may easily miss an important activity notification in the running game application. Consequently, the user misses an important activity in the game application.

Unlike the above typical data display method, in the disclosed data display method, the to-be-displayed game data in a game application running on a mobile terminal is displayed by using a desktop plug-in on the mobile terminal, to directly and separately display the game data, among other information/message, to a user by using the desktop plug-in.

In this manner, the user may avoid missing important game data, and accuracy of display of the game data may be improved, thereby improving the display effect and also the user experience. Further, with the disclosed data display methods, the game data is displayed by directly using a desktop plug-in without using any new/additional components or downloading any new/additional applications to the mobile terminal. Therefore, a running speed of a mobile terminal is optimized, and user experience is improved.

Optionally, the desktop plug-in may include at least one of the following: a system plug-in, a first application plug-in, a second application plug-in, and a game application plug-in. The system plug-in may include, but be not limited to, a plug-in pre-installed by the mobile terminal, such as a dial clock plug-in and a weather plug-in. The first application plug-in may include, but be not limited to, a game platform plug-in including the game application. For example, a plug-in configured by a comprehensive game platform application used for installing different game applications.

Figure 3:
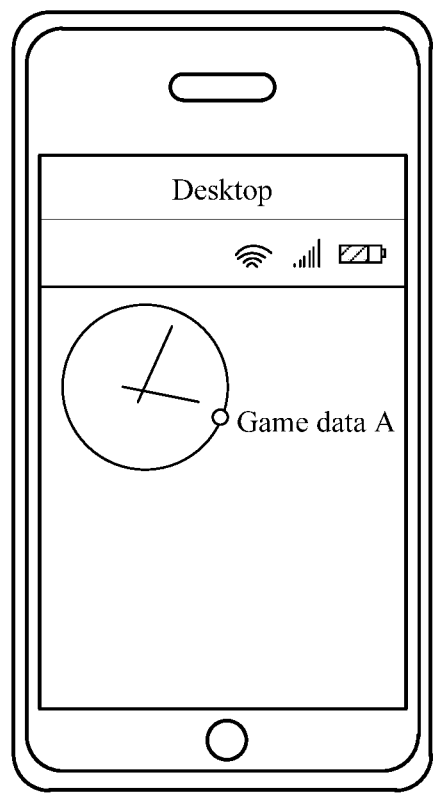
FIG. 3 is a schematic diagram of another exemplary data display method according to various embodiments of the present disclosure.

In various embodiments, the desktop plug-in used for displaying the game data may be set as a plug-in built in the first application or a pre-installed system plug-in, or a plug-in that is built in a second application, e.g., any other applications that different from the first application, and that is installed on the mobile terminal, and the game data is combined to the plug-in and then is pushed to the user for display. For example, as shown in FIG. 3, a dial clock plug-in built in the system displays game data A. Therefore, a display effect of the game data is improved, to avoid disturbance to the user of the mobile terminal.

Optionally, the game data may separately display the game event or may display the game event and the event time of the game event that have a correspondence. The event time that has a correspondence with the game event may include, but be not limited to, at least one of the following: an occurrence time of the game event and/or a completion time of the game event.

Optionally, the game data may include, but be not limited to, a health point of a currently-logged-in game, social information of the current game, an opening-time reminder of a copy, game information, a game guide, a rank and an online duration of a player. The social information of the current game may include, but be not limited to: chat information in the game application and acceptance/rejection of a game friend request. Any other information may be included according to various embodiments of the present disclosure.

Optionally, the game data may include, but be not limited to, game data of a same game application and game data of different game applications.

Optionally, the game data may be, for example, obtained according to preconfigured configuration information. The configuration information may include, but be not limited to, a data element used for configuring the to-be-displayed game data. The game data may include, for example, the data element and a data value. That is, the data element of the (to-be-displayed) game data may be obtained by pre-selection and per-configuration from all data elements. As such, when obtaining the game data, the data element may be obtained according to the configuration information and the data value may be obtained corresponding to the data element. For example, in the configuration information, the data element: "a health point of a currently-logged-in game" in the to-be-displayed game data may be selected to display. In this case, when obtaining the (to-be-displayed) game data, "a health point of a currently-logged-in game" and a health point, such as 500 points, corresponding to "a health point of a currently-logged-in game" are obtained.

Optionally, after the to-be-displayed game data is displayed on the desktop plug-in, the process may include, but be not limited to: receiving an operation instruction used for instructing an operation on the game data, so as to directly perform a corresponding operation on the game data without opening the corresponding game application. That is, an operation is directly performed on the game data displayed on the desktop plug-in. This may solve a problem in conventional methods that long operation time is needed to perform the operation after opening the game application and entering the game application. The disclosed data display method may simplify an operation, save an operation time, and improve operation efficiency, so as to optimize a running speed of the mobile terminal.

In this manner, to-be-displayed game data in a game application running on a mobile terminal is obtained by using a first application, and the to-be-displayed game data in the game application running on the mobile terminal is displayed by combining a desktop plug-in corresponding to the first application, thereby directly and separately displaying the game data mixed in other information/messages to a user by using the desktop plug-in. The user may avoid missing important game data, and accuracy of display of the to-be-displayed game data may be improved, thereby improving a display effect and user experience. Further, with the disclosed data display methods, the game data is displayed by directly using a desktop plug-in without using any new/additional components or downloading any new/additional applications to the mobile terminal. Therefore, a running speed of a mobile terminal is optimized, and user experience is improved.

Optionally, before the obtaining the game data in a game application running on a mobile terminal via a first application, the method further includes receiving a plug-in operation instruction and setting a correspondence relationship between the first application indicated by the plug-in operation instruction and the desktop plug-in. The desktop plug-in is a plug-in built in the first application, or a plug-in built in a system running on the mobile terminal, or a plug-in built in a second application installed on the mobile terminal.

Figures 4, 5:
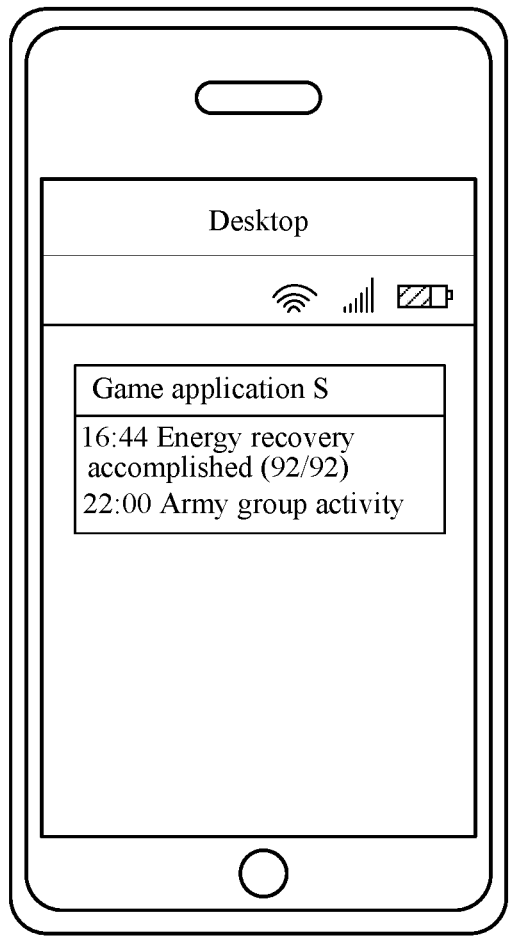
FIG. 4 is a schematic diagram of another data display method according to various embodiments of the present disclosure.
FIG. 5 is a schematic diagram of a configuration interface for configuring information in an exemplary data display method according to various embodiments of the present disclosure.

In a certain embodiment, a game application running on a mobile terminal may be a game application S, and the desktop plug-in may be a plug-in built in the first application. A floating window is shown in FIG. 4, the game data displayed in the plug-in may be: for example, a game event as: "energy recovery accomplished", an event time corresponding to the game event as a recovery completion time, e.g., 16:44; a game event as: "army group activity", and an event time corresponding to the game event as an activity start time, e.g., 22:00. The floating window shown in FIG. 4 is only an example for illustration purposes and is not limited according to various embodiments of the present disclosure.

The desktop plug-in used for displaying the to-be-displayed game data may also be a pre-installed system plug-in combined with the to-be-displayed game data to push the to-be-displayed game data to the user for display. For example, FIG. 3 shows combining the game data with a dial clock of the mobile terminal for display. The to-be-displayed game data may also be combined with a plug-in built in the second application installed on the mobile terminal, such as a weather application plug-in previously installed on the mobile terminal, and the game data is combined with the weather application desktop plug-in on the mobile terminal, to separately and timely display the game data.

In various embodiments, after the plug-in operation instruction is received, the game event and the event time corresponding to the game data are directly displayed in different desktop plug-ins, for example, selected from the plug-in built in the first application, the plug-in built in the system, and the plug-in built in the second application. The game event and the corresponding event time may thus be accurately prompted to the user when the game data is displayed by combining the desktop plug-in, to improve a display effect and improve user experience.

Optionally, before the obtaining of to-be-displayed game data in a game application running on a mobile terminal, the disclosed methods further includes S12: obtaining a data operation instruction from the first application. When implementing S2, the disclosed method further includes S22: pushing, to the desktop plug-in, data indicated by the data operation instruction in the game application indicated by the data operation instruction received by the first application as the to-be-displayed game data for display.

Optionally, the data operation instruction may include at least one of the following: indication information used for indicating a to-be-displayed game application and indication information used for indicating to-be-displayed data content. For example, the data operation instruction may indicate an application identifier, such as an application S, of the to-be-displayed game application in multiple game applications included in the first application and may also indicate a data element, such as "a health point of a currently-logged-in game", "game information", and "a rank and an online duration of a player", of to-be-displayed data in the to-be-displayed game application. As a result, the to-be-displayed data as the to-be-displayed game data is pushed to the desktop plug-in for display.

Optionally, the game data that is selected and configured by the first application may include, but be not limited to, game data of a same game application and game data of different game applications. That is, in configuration information, different data elements of game data of a same game application or a same data element of game data of different game applications may be selected.

For example, FIG. 5 illustrates a configuration interface. Data elements of the to-be-displayed game data are selected and configured from all data elements. For example, "a health point of currently-logged-in game", "game information", and "a rank and an online duration of a player" are selected and configured. The data elements of the game data shown in FIG. 5 are only examples for illustration purposes and are not limited in accordance with various embodiments of the present disclosure.

As such, configuration information of the game data is obtained in the first application, so that the first application selects the to-be-displayed game data from the received game data of the game application and pushes the to-be-displayed game data to the desktop plug-in of the mobile terminal for display. As a result, the to-be-displayed game data is displayed on the desktop plug-in of the mobile terminal according to the configuration information configured by the first application.

Optionally, the displaying of the game data in a desktop plug-in corresponding to the first application includes displaying a dial clock in the desktop plug-in, the game event and the event time corresponding to the game event being displayed at a position, the position corresponding to the event time, in the dial clock.

Figure 6:
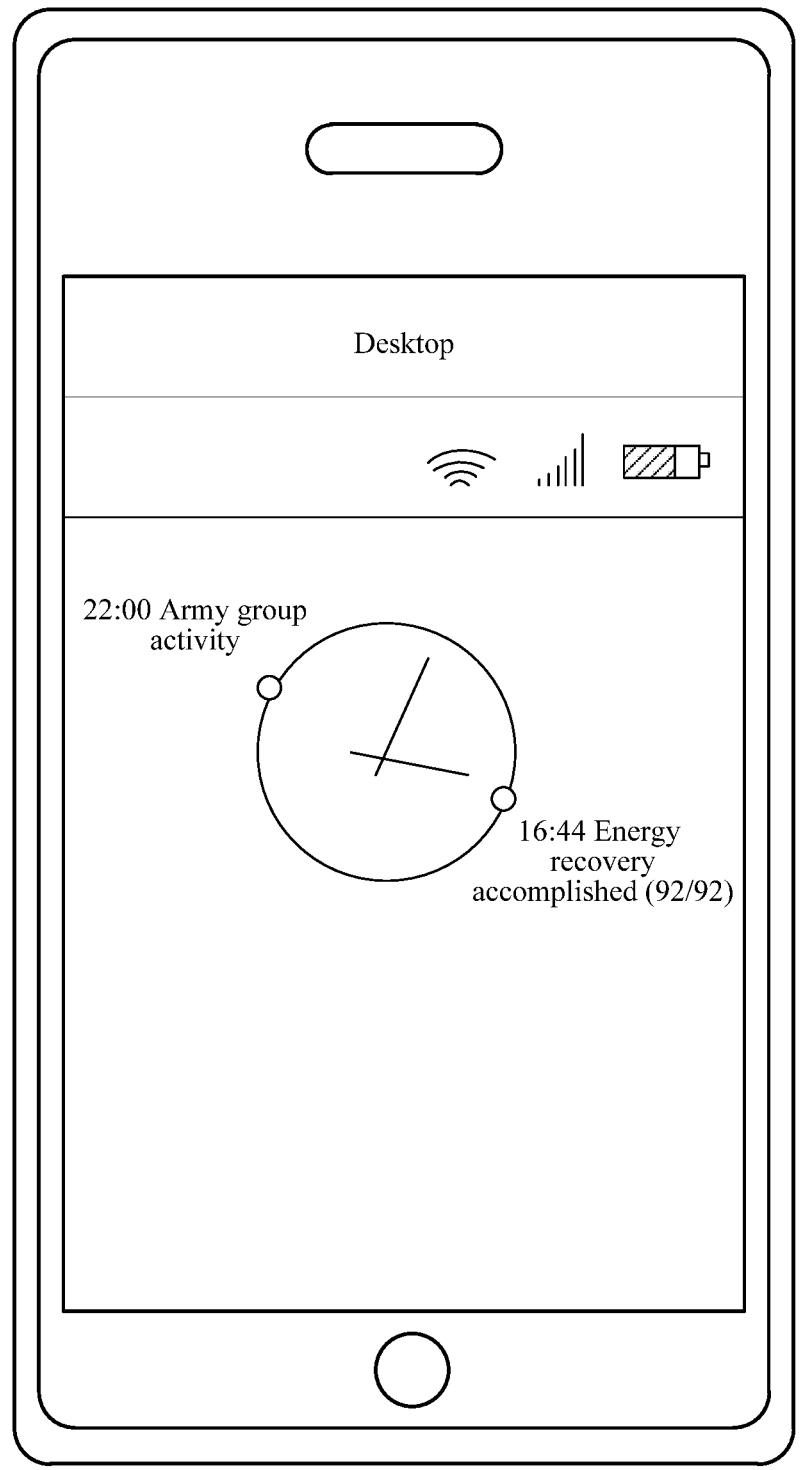
FIG. 6 is a schematic diagram of another exemplary data display method according to various embodiments of the present disclosure.

In an exemplary embodiment, a game application running on the mobile terminal may be a game application S. After the dial clock is displayed in the desktop plug-in, the obtained (to-be-displayed) game data in the game application S may be combined with the game application S for display. For example, the game event and the event time in the game data are displayed at a moment, corresponding to the event time, in the dial clock according to the event time of the game data. Specifically, as shown in FIG. 6, a game event is: "energy recovery accomplished", a corresponding event time is a recovery completion time, e.g., 16:44; a game event is: "army group activity", and a corresponding event time is an activity start time, e.g., 22:00. The game data is displayed at a corresponding position of the dial clock according to the event time.

As such, the game event and the event time that have a correspondence with each other in the game data are intuitively displayed on the dial clock in the desktop plug-in, so that the game event and the corresponding event time in the game data are intuitively and accurately prompted to the user for the user to decide if/how he/she would like to respond to this prompted game event. For example, once the user receives the game event prompted in the desktop plug-in on the mobile terminal, the user may decide to respond to this game event by directly and/or immediately performing a short operation on the desktop plug-in or by entering the corresponding game application to perform a complicated operation. Display effect may thus be improved and the user may avoid missing any game data.

Optionally, after the displaying of the game data in a desktop plug-in corresponding to the first application, the method further includes receiving an operation instruction and performing the operation instructed by the operation instruction on the game data. The operation instruction is used to instruct an operation on the game data.

Optionally, the operation indicated by the operation instruction may include, but be not limited to, at least one of the following: click and drag. Any other suitable operations may be included in the operation instruction according to various embodiments of the present disclosure.

Optionally, the operation instructed by the operation instruction on the game data includes at least one of the following.

1) Displaying description information of the game data on the desktop.

2) Switching the game application from a background of the mobile terminal to a foreground for running.

3) Switching a current display interface of the desktop plug-in to a following display interface, where the game data is displayed in multiple display interfaces of the desktop plug-in, where the multiple display interfaces include at least the current display interface and the following display interface.

4) Sending verification passing information to the game application.

5) Setting a reminded event used for reminding at a preset time.

In this manner, corresponding operation is directly performed on the game data according to the operation instruction, without opening and entering the corresponding game application. This is unlike conventional methods that require long operation time for performing an operation by first opening and then entering the game application. The disclosed methods may thus simplify an operation, save an operation time, and improve operation efficiency, so as to optimize a running speed of the mobile terminal.

Optionally, the operation instructed by the operation instruction on the game data includes at least one of the following.

1) Displaying description information of the game data on the desktop.

Figure 7:
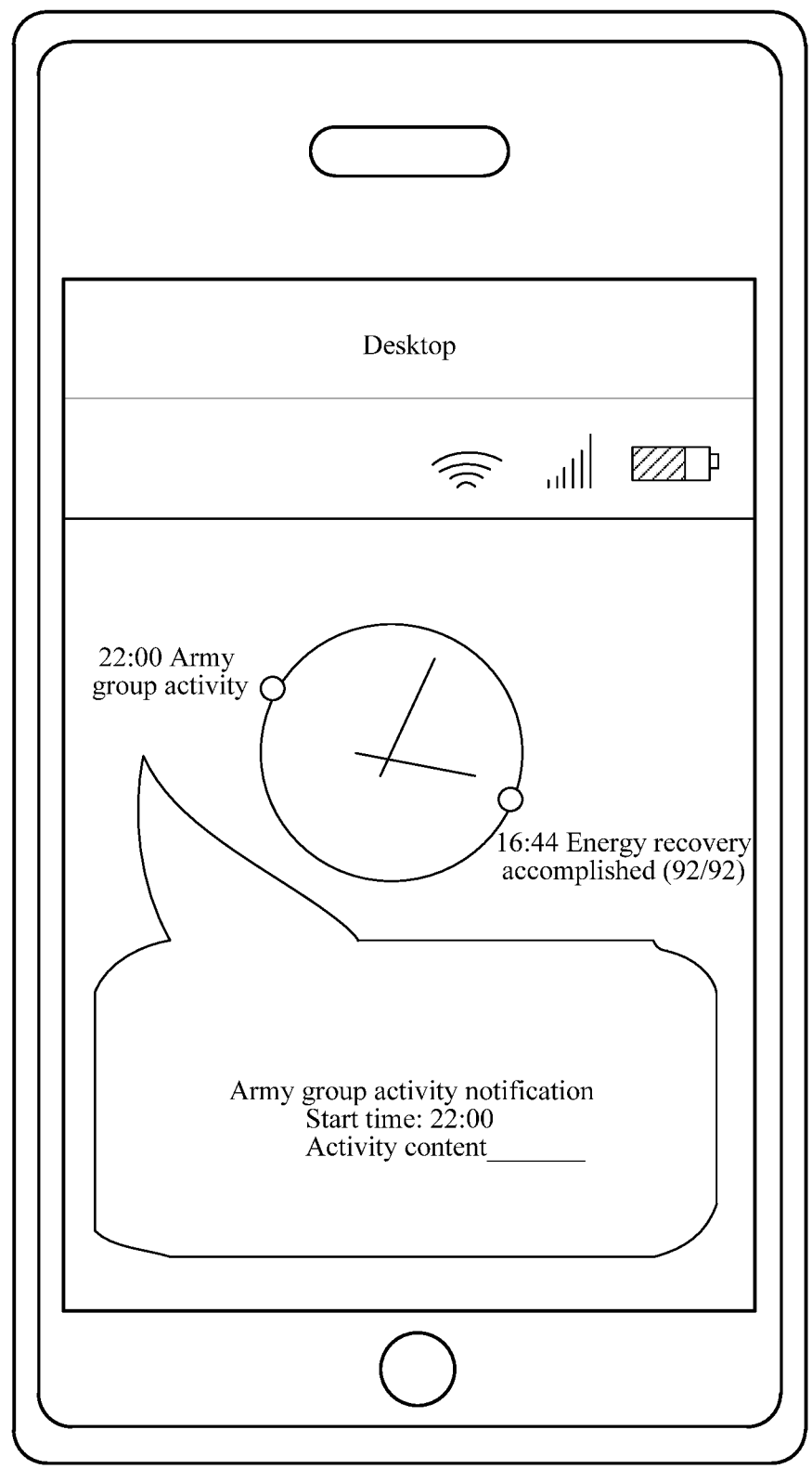
FIG. 7 is a schematic diagram of another exemplary data display method according to various embodiments of the present disclosure.

For example, after a click operation on the game event in the game data is received, specific description information of the game event in the game data may be directly displayed on the desktop of the mobile terminal. For example, as shown in FIG. 7, after a game event "army group activity" is clicked, specific activity notification content of "army group activity" is displayed on the desktop.

2) Switching the game application for running from a background of the mobile terminal to a foreground of the mobile terminal.

Figure 8:
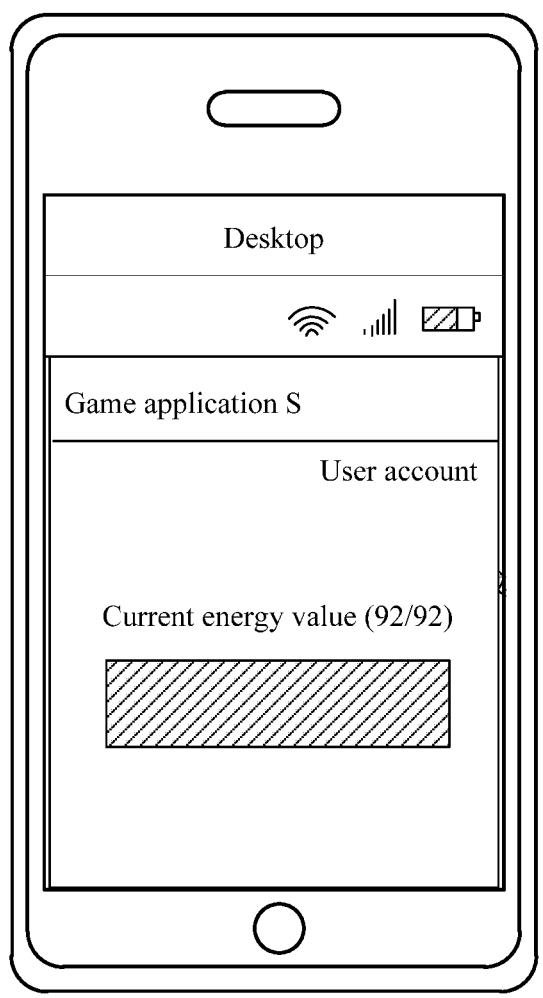
FIG. 8 is a schematic diagram of another exemplary data display method according to various embodiments of the present disclosure.

For example, after the click operation on the game event in the game data is received, the game application may be switched for running from the background of the mobile terminal to the foreground of the mobile terminal and directly entering the game application. For example, as shown in FIG. 8, after the game event "energy recovery accomplished" is clicked, a corresponding game application (such as a game application S) is entered directly, to display a current energy value of a user account that the mobile terminal has logged in to.

3) Switching a current display interface of the desktop plug-in to a following display interface. The game data is displayed in multiple display interfaces of the desktop plug-in, and the multiple display interfaces include at least the current display interface and the following display interface.

Figure 9:
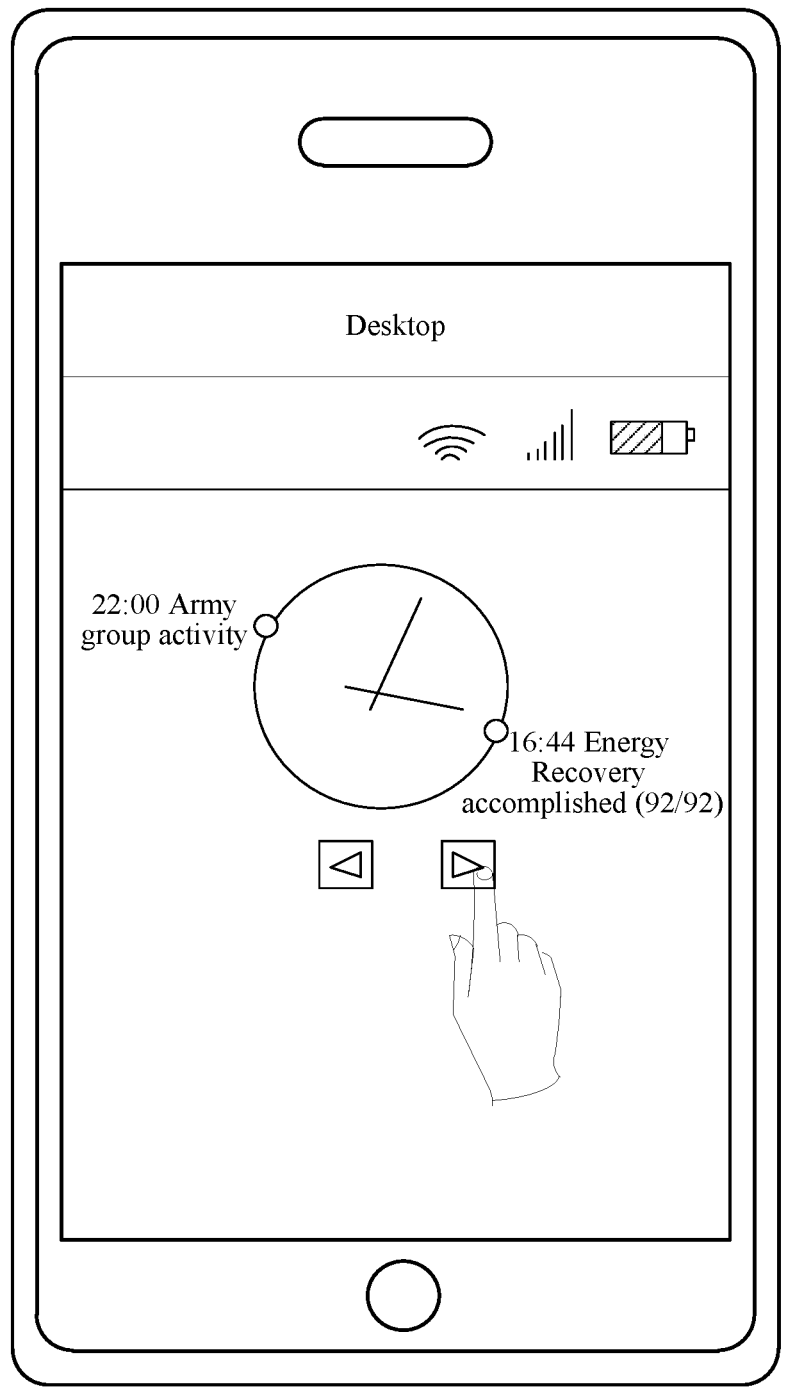
FIG. 9 is a schematic diagram of another exemplary data display method according to various embodiments of the present disclosure.

For example, after the click operation on the game event in the game data is received, the current display interface of the desktop plug-in may be switched to the following display interface. For example, as shown in FIG. 9, after an indication key of a following page is clicked, the following display interface is switched thereto. In this manner, different operations are performed on the game data according to an indication of the operation instruction, to provide various display manners and display interfaces to the user, so as to improve user experience and avoid information disturbance to the user.

4) Sending verification passing information to the game application.

For example, when friend verification information sent by a friend is received, the verification information is displayed on the desktop of the mobile terminal by using the desktop plug-in, to send the verification passing information to a friend in the game application.

5) Setting a reminded event used for reminding at a preset time.

For example, the reminded event, such as a clock reminder, used for reminding the user is set in the desktop plug-in (such as a dial clock), to initiate a clock reminder to the user when the preset time indicated by the event time of the game event arrives. The user may thus avoid missing the game event.

Accordingly, different operations are performed on the game data according to an indication of the operation instruction, to provide various display manners and display interfaces to the user. This may improve user experience and avoid information disturbance to the user.

It should be noted that for simple descriptions, the foregoing methods are described as a series of actions. However, a person skilled in the art should know that the present disclosure is not limited to the sequence/order of the described actions. Therefore, according to the present disclosure, some steps may be performed in different sequences/orders or may be simultaneously performed. Secondly, a person skilled in the art should also know that the embodiments described in the present specification are all exemplary embodiments. Some actions may be omitted and other actions may be added for the present disclosure.

In various embodiments, the disclosed methods may be implemented hardware only or by a combination of hardware and software. In some cases, the technical solutions of the present disclosure may be implemented in a form of a software product. The computer software product may be stored in a storage medium (such as a ROM/RAM, a magnetic disk, or an optical disc) and includes program instructions for instructing a terminal device (which may be a mobile phone, a computer, a server, a network device, or the like) to perform the methods described in the embodiments of the present disclosure.

In various embodiments, a non-transitory computer-readable storage medium containing computer-executable program instructions for, when executed by one or more processor, performing the disclosed data display method. For example, the one or more processors may be configured in the mobile terminal.

Various embodiments of the present disclosure provide a data display apparatus. For illustration purposes, exemplary data display apparatus may be described with respect to the disclosed data display methods. As such, related description may not be repeated for the data display apparatus.

Figure 10:
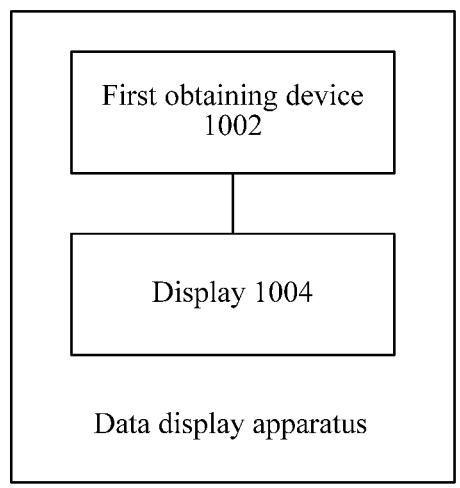
FIG. 10 is a schematic diagram of an exemplary data display apparatus according to various embodiments of the present disclosure.

FIG. 10 illustrates an exemplary data display apparatus, used for performing the data display method. As shown in FIG. 10, the apparatus includes: a first obtaining device 1002 and/or a display 1004.

The first obtaining device 1002 is configured to obtain game data of a game application running on a mobile terminal via a first application, the game data including at least one of: a game event and an event time corresponding to the game event.

The display 1004 is configured to display the game data in a desktop plug-in corresponding to the first application, the desktop plug-in being displayed on a desktop of the mobile terminal.

Optionally, the data display apparatus may be applied to implement a method including displaying game data in a game application (such as a phonegame) on a desktop of a mobile terminal. Referring back to FIG. 1, the game data or the to-be-displayed game data of the game application, that runs on the mobile terminal 102 and that is obtained by the application server 104, may be displayed in the desktop plug-in corresponding to the first application, to improve display effect without having game data mixed with other data when displaying, so as to accurately and timely prompt the game data of the game application to the user of the mobile terminal. Further, the game data is displayed in the desktop plug-in of the mobile device, without disturbing the user of the mobile terminal, which improves user experience.

A typical data display method includes: mixing game data with other messages and pushing the game data and other messages to a user by using a message center for display. For example, an activity notification in the game application and information such as real-time news and a session notification of an instant messaging application are mixed and are pushed and displayed to the user by using a message box of the mobile terminal (such as a mobile phone). Apparently, when there is a large amount of to-be-displayed data content, a game player may easily miss an important activity notification in the running game application. Consequently, the user misses an important activity in the game application.

Unlike the above typical data display method, the to-be-displayed game data in a game application running on a mobile terminal is displayed by using a desktop plug-in on the mobile terminal, to directly and separately display the game data, among other information/message, to a user by using the desktop plug-in. In this manner, the user may avoid missing important game data, and accuracy of display of the game data may be improved, thereby improving the display effect and also the user experience. Further, with the disclosed data display apparatus, the game data is displayed by directly using a desktop plug-in without using any new/additional components or downloading any new/additional applications to the mobile terminal. Therefore, a running speed of a mobile terminal is optimized, and user experience is improved.

Optionally, the desktop plug-in may include at least one of the following: a system plug-in, a first application plug-in, a second application plug-in, and a game application plug-in. The system plug-in may include, but be not limited to, a plug-in pre-installed by the mobile terminal, such as a dial clock plug-in and a weather plug-in. The first application plug-in may include, but be not limited to, a game platform plug-in including the game application. For example, a plug-in configured by a comprehensive game platform application used for installing different game applications.

In various embodiments, the desktop plug-in used for displaying the game data may be set as a plug-in built in the first application or a pre-installed system plug-in, or a plug-in that is built in a second application, e.g., any other applications that different from the first application, and that is installed on the mobile terminal, and the game data is combined to the plug-in and then is pushed to the user for display. For example, as shown in FIG. 3, a dial clock plug-in built in the system displays game data A. Therefore, a display effect of the game data is improved, to avoid disturbance to the user of the mobile terminal.

Optionally, the game data may separately display the game event or may display the game event and the event time of the game event that have a correspondence. The event time that has a correspondence with the game event may include, but be not limited to, at least one of the following: an occurrence time of the game event and/or a completion time of the game event.

Optionally, the game data may include, but be not limited to, a health point of a currently-logged-in game, social information of the current game, an opening-time reminder of a copy, game information, a game guide, a rank and an online duration of a player. The social information of the current game may include, but be not limited to: chat information in the game application and acceptance/rejection of a game friend request. Any other suitable information may be included according to various embodiments of the present disclosure.

Optionally, the game data may include, but be not limited to, game data of a same game application and game data of different game applications.

Optionally, the game data may be, for example, obtained according to preconfigured configuration information. The configuration information may include, but be not limited to, a data element used for configuring the to-be-displayed game data. The game data may include, for example, the data element and a data value. That is, the data element of the (to-be-displayed) game data may be obtained by pre-selection and per-configuration from all data elements. As such, when obtaining the game data, the data element may be obtained according to the configuration information and the data value may be obtained corresponding to the data element. For example, in the configuration information, the data element: "a health point of a currently-logged-in game" in the to-be-displayed game data may be selected to display. In this case, when obtaining the (to-be-displayed) game data, "a health point of a currently-logged-in game" and a health point, such as 500 points, corresponding to "a health point of a currently-logged-in game" are obtained.

Optionally, after the to-be-displayed game data is displayed on the desktop plug-in, the process may include, but be not limited to: receiving an operation instruction used for instructing an operation on the game data, so as to directly perform a corresponding operation on the game data without opening the corresponding game application. That is, an operation is directly performed on the game data displayed on the desktop plug-in. This may solve a problem in conventional methods that long operation time is needed to perform the operation after opening the game application and entering the game application. The disclosed data display method may simplify an operation, save an operation time, and improve operation efficiency, so as to optimize a running speed of the mobile terminal.

In this manner, to-be-displayed game data in a game application running on a mobile terminal is obtained by using a first application, and the to-be-displayed game data in the game application running on the mobile terminal is displayed by combining a desktop plug-in corresponding to the first application, thereby directly and separately displaying the game data mixed in other information/messages to a user by using the desktop plug-in. The user may avoid missing important game data, and accuracy of display of the to-be-displayed game data may be improved, thereby improving a display effect and user experience. Further, with the disclosed data display methods, the game data is displayed by directly using a desktop plug-in without using any new/additional components or downloading any new/additional applications to the mobile terminal. Therefore, a running speed of a mobile terminal is optimized, and user experience is improved.

Optionally, the disclosed apparatus further includes a first receiver and/or a setting device.

The first receiver is configured to receive a plug-in operation instruction before obtaining the to-be-displayed game data in a game application running on a mobile terminal.

The setting device is configured to set a correspondence relationship between the first application indicated by the plug-in operation instruction and the desktop plug-in. The desktop plug-in is a plug-in built in the first application, or a plug-in built in a system running on the mobile terminal, or a plug-in built in a second application installed on the mobile terminal.

In an exemplary embodiment, a game application running on a mobile terminal may be a game application S, and the desktop plug-in may be a plug-in built in the first application. A floating window is shown in FIG. 4, the game data displayed in the plug-in may be: for example, a game event as: "energy recovery accomplished", an event time corresponding to the game event as a recovery completion time, e.g., 16:44; a game event as: "army group activity", and an event time corresponding to the game event as an activity start time, e.g., 22:00. The floating window shown in FIG. 4 is only an example for illustration purposes and is not limited according to various embodiments of the present disclosure.

The desktop plug-in used for displaying the to-be-displayed game data may also be a pre-installed system plug-in combined with the to-be-displayed game data to push the to-be-displayed game data to the user for display. For example, FIG. 3 shows combining the game data with a dial clock of the mobile terminal for display. The to-be-displayed game data may also be combined with a plug-in built in the second application installed on the mobile terminal, such as a weather application plug-in previously installed on the mobile terminal, and the game data is combined with the weather application desktop plug-in on the mobile terminal, to separately and timely display the game data.

In various embodiments, after the plug-in operation instruction is received, the game event and the event time corresponding to the game data are directly displayed in different desktop plug-ins, for example, selected from the plug-in built in the first application, the plug-in built in the system, and the plug-in built in the second application. The game event and the corresponding event time may thus be accurately prompted to the user when the game data is displayed by combining the desktop plug-in, to improve a display effect and improve user experience.

Optionally, the apparatus further includes: a second obtaining device, configured to obtain a data operation instruction in the first application before obtaining the to-be-displayed game data in the game application running on the mobile terminal.

The first obtaining device includes: a processing device, configured to push, to the desktop plug-in, data indicated by the data operation instruction in the game application indicated by the data operation instruction received by the first application as the to-be-displayed game data for display.

Optionally, the data operation instruction may include at least one of the following: indication information used for indicating a to-be-displayed game application and indication information used for indicating to-be-displayed data content. For example, the data operation instruction may indicate an application identifier, such as an application S, of the to-be-displayed game application in multiple game applications included in the first application and may also indicate a data element, such as "a health point of a currently-logged-in game", "game information", and "a rank and an online duration of a player", of to-be-displayed data in the to-be-displayed game application. As a result, the to-be-displayed data as the to-be-displayed game data is pushed to the desktop plug-in for display.

Optionally, the game data that is selected and configured by the first application may include, but be not limited to, game data of a same game application and game data of different game applications. That is, in configuration information, different data elements of game data of a same game application or a same data element of game data of different game applications may be selected.

For example, FIG. 5 illustrates a configuration interface. Data elements of the to-be-displayed game data are selected and configured from all data elements. For example, "a health point of currently-logged-in game", "game information", and "a rank and an online duration of a player" are selected and configured. The data elements of the game data shown in FIG. 5 are only examples for illustration purposes and are not limited in accordance with various embodiments of the present disclosure.

As such, configuration information of the game data is obtained in the first application, so that the first application selects the to-be-displayed game data from the received game data of the game application and pushes the to-be-displayed game data to the desktop plug-in of the mobile terminal for display. As a result, the to-be-displayed game data is displayed on the desktop plug-in of the mobile terminal according to the configuration information configured by the first application.

Optionally, the display 1004 includes: 1) a display device, configured to display a dial clock in the desktop plug-in. The game event and the event time that have a correspondence with each other are displayed at a position, corresponding to the event time, in the dial clock.

In an exemplary embodiment, a game application running on the mobile terminal may be a game application S. After the dial clock is displayed in the desktop plug-in, the obtained (to-be-displayed) game data in the game application S may be combined with the game application S for display. For example, the game event and the event time in the game data are displayed at a moment, corresponding to the event time, in the dial clock according to the event time of the game data. Specifically, as shown in FIG. 6, a game event is: "energy recovery accomplished", a corresponding event time is a recovery completion time, e.g., 16:44; a game event is: "army group activity", and a corresponding event time is an activity start time, e.g., 22:00. The game data is displayed at a corresponding position of the dial clock according to the event time.

As such, the game event and the event time that have a correspondence with each other in the game data are intuitively displayed on the dial clock in the desktop plug-in, so that the game event and the corresponding event time in the game data are intuitively and accurately prompted to the user for the user to decide if/how he/she would like to respond to this prompted game event. For example, once the user receives the game event prompted in the desktop plug-in on the mobile terminal, the user may decide to respond to this game event by directly and/or immediately performing a short operation on the desktop plug-in or by entering the corresponding game application to perform a complicated operation. Display effect may thus be improved and the user may avoid missing any game data.

Optionally, the apparatus further includes a second receiver and/or an operation device.

The second receiver is configured to receive an operation instruction after displaying the game data in a desktop plug-in corresponding to the first application, the operation instruction being used for indicating performing an operation on the game data; and The operation device is configured to perform the operation indicated by the operation instruction on the game data.

Optionally, the operation indicated by the operation instruction may include, but be not limited to, at least one of the following: click and drag. Any other suitable operations may be included in the operation instruction according to various embodiments of the present disclosure.

Optionally, the operation instructed by the operation instruction on the game data includes one of the following.

1) Displaying description information of the game data on the desktop.

2) Switching the game application from a background of the mobile terminal to a foreground for running.

3) Switching a current display interface of the desktop plug-in to a following display interface, where the game data is displayed in multiple display interfaces of the desktop plug-in, where the multiple display interfaces include at least the current display interface and the following display interface.

4) Sending verification passing information to the game application.

5) Setting a reminded event used for reminding at a preset time.

In this manner, corresponding operation is directly performed on the game data according to the operation instruction, without opening and entering the corresponding game application. This is unlike conventional methods that require long operation time for performing an operation by first opening and then entering the game application. The disclosed apparatus may thus simplify an operation, save an operation time, and improve operation efficiency, so as to optimize a running speed of the mobile terminal.

Optionally, the operation device includes at least one of a first operation device, a second operation device, a third operation device, a fourth operation device, and a fifth operation device.

The first operation device is configured to display description information of the game data on the desktop.

For example, after a click operation on the game event in the game data is received, specific description information of the game event in the game data may be directly displayed on the desktop of the mobile terminal. For example, as shown in FIG. 7, after a game event "army group activity" is clicked, specific activity notification content of "army group activity" is displayed on the desktop.

The second operation device is configured to switch the game application for running from a background of the mobile terminal to a foreground.

For example, after the click operation on the game event in the game data is received, the game application may be switched for running from the background of the mobile terminal to the foreground of the mobile terminal and directly entering the game application. For example, as shown in FIG. 8, after the game event "energy recovery accomplished" is clicked, a corresponding game application (such as a game application S) is entered directly, to display a current energy value of a user account that the mobile terminal has logged in to.

The third operation device is configured to switch a current display interface of the desktop plug-in to a following display interface. The game data is displayed in multiple display interfaces of the desktop plug-in, and the multiple display interfaces include at least the current display interface and the following display interface.

For example, after the click operation on the game event in the game data is received, the current display interface of the desktop plug-in may be switched to the following display interface. For example, as shown in FIG. 9, after an indication key of a following page is clicked, the following display interface is switched thereto. In this manner, different operations are performed on the game data according to an indication of the operation instruction, to provide various display manners and display interfaces to the user, so as to improve user experience and avoid information disturbance to the user.

The fourth operation device is configured to send verification passing information to the game application.

For example, when friend verification information sent by a friend is received, the verification information is displayed on the desktop of the mobile terminal by using the desktop plug-in, to send the verification passing information to a friend in the game application.

The fifth operation device is configured to set a reminded event used for reminding at a preset time.

For example, the reminded event, such as a clock reminder, used for reminding the user is set in the desktop plug-in (such as a dial clock), to initiate a clock reminder to the user when the preset time indicated by the event time of the game event arrives. The user may thus avoid missing the game event.

Accordingly, different operations are performed on the game data according to an indication of the operation instruction, to provide various display manners and display interfaces to the user. This may improve user experience and avoid information disturbance to the user.

Figure 11:
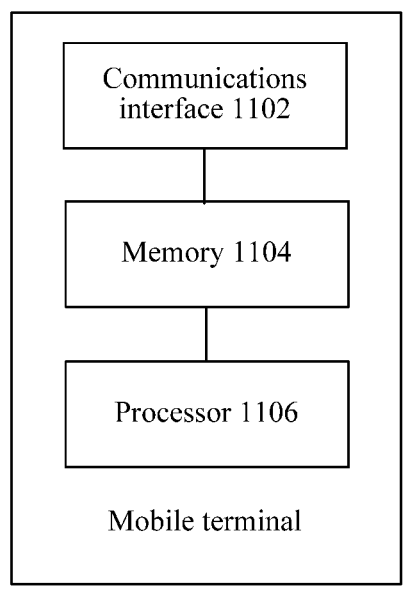
FIG. 11 is a schematic diagram of an exemplary mobile terminal used for implementing a data display method according to various embodiments of the present disclosure.

Various embodiments of the present disclosure further provide a mobile terminal used for implementing the data display method. As shown in FIG. 11, the mobile terminal includes a communications interface 1102, a memory 1104, and/or a processor 1106. More devices/components may be added.

The communications interface 1102 is configured to obtain game data, such as to-be-displayed game data, in a game application running on the mobile terminal, the game data including: a game event, or a game event and an event time of the game event that have a correspondence with each other.

The memory 1104 is connected to the communications interface 1102 and configured to store the game data.

The processor 1106 is connected to the memory 1104 and configured to display the game data in a desktop plug-in corresponding to the first application, the desktop plug-in being displayed on a desktop of the mobile terminal.

In some embodiments, computer-executable program instructions may be stored in the memory 1104 and executed by the processor 1106 for performing the disclosed data display method. In other embodiments, a non-transitory computer-readable storage medium may further be included to contain computer-executable program instructions, which may be executed by the processor 1106 for performing the disclosed data display method. Details in related with the disclosed methods and apparatus are not repeated herein.

Various embodiments of the present disclosure further provide a storage medium. In one embodiment, the storage medium may be a non-transitory computer-readable storage medium, containing computer-executable program instructions (or code), which may be executed by one or more processors for performing the disclosed data display method as follows.

S1: obtaining game data of a game application running on a mobile terminal via a first application, the game data including one or more of: a game event and an event time corresponding to the game event.

S2: displaying the game data in a desktop plug-in corresponding to the first application, the desktop plug-in being displayed on a desktop of the mobile terminal.

Optionally, before obtaining the game data, the one or more processors are configured to perform: receiving a plug-in operation instruction; and setting a correspondence relationship between the first application indicated by the plug-in operation instruction and the desktop plug-in on the mobile terminal. The desktop plug-in is a plug-in built in the first application configured in an application server, or a plug-in built in a system running on the mobile terminal, or a plug-in built in a second application installed on the mobile terminal.

Optionally, the one or more processors are configured to perform: obtaining a data operation instruction from the first application before obtaining the game data, and pushing, to the desktop plug-in, data indicated by the data operation instruction in the game application indicated by the data operation instruction received by the first application as the game data for display.

Optionally, the one or more processors are configured to perform: displaying a dial clock in the desktop plug-in, wherein the game event and the event time corresponding to the game event are displayed at a position, corresponding to the event time, in the dial clock.

Optionally, the one or more processors are configured to perform: receiving an operation instruction, configured to instruct an operation on the game data; and performing the operation instructed by the operation instruction on the game data.

Optionally, the storage medium may include, but be not limited to: any medium that can store program instructions/code, such as a USB flash drive, a read only memory (ROM), a random access memory (RAM), a removable hard disk, a magnetic disk, or an optical disc.

Optionally, details in related with the disclosed methods, apparatus, and storage medium are not repeated herein.

In this manner, to-be-displayed game data in a game application running on a mobile terminal is obtained by using a first application, and the to-be-displayed game data in the game application running on the mobile terminal is displayed by combining a desktop plug-in corresponding to the first application, thereby directly and separately displaying the game data mixed in other information/messages to a user by using the desktop plug-in. The user may avoid missing important game data, and accuracy of display of the to-be-displayed game data may be improved, thereby improving a display effect and user experience. Further, with the disclosed data display methods, the game data is displayed by directly using a desktop plug-in without using any new/additional components or downloading any new/additional applications to the mobile terminal. Therefore, a running speed of a mobile terminal is optimized, and user experience is improved.

The sequence numbers of the foregoing embodiments of the present disclosure are merely for the convenience of description, and do not imply the preference among the embodiments. In the foregoing embodiments of the present disclosure, descriptions for the embodiments have different emphasis. For a part of an embodiment that is not described in detail, refer to relevant descriptions of other embodiments.

The described apparatus are merely exemplary. For example, division of the units/devices is merely division of logic functions and may be another division manner during actual implementation. For example, multiple units, devices, or components may be combined or may be integrated into another system, or some features may be omitted or not be executed. In addition, the displayed or discussed mutual coupling, or direct coupling, or communication connections may be implemented through some interfaces. The indirect coupling or communication connections between the devices/components may be implemented in electronic, mechanical, or other forms. The devices/components described as separate parts may or may not be physically separate, and the parts displayed as devices/components may or may not be physical units, may be located in one position, or may be distributed on a plurality of network units. A part of or all of the units devices/components be selected according to actual needs to achieve the objectives of the solutions of the embodiments.

In addition, functional units/devices in the embodiments of the present disclosure may be integrated into one processing unit (or processor), or each of the units/devices may exist alone physically, or two or more units/devices may be integrated into one unit. The foregoing integrated units/ device can be implemented in a form of hardware or can be implemented in a form of a software functional module.

The foregoing descriptions are merely preferred embodiments of the present disclosure. It should be noted that a person of ordinary skill in the art may further make variations and improvements without departing from the principle of the present disclosure, which shall fall within the protection scope of the present disclosure.

What is claimed is:

1. A data display method, comprising:
   obtaining game data of a game application running on a mobile terminal via a first application, the game data comprising one or more of: a game event and an event time corresponding to the game event;
   providing a user interface on the mobile terminal to display the game data in a desktop plug-in corresponding to the first application, the desktop plug-in being displayed on a desktop of the mobile terminal, wherein the user interface comprises: a dial clock including the game data by displaying the game event on the dial clock at a position of the dial clock corresponding to the event time; and
   when the game event on the dial clock is clicked by a user, displaying an activity content on the desktop of the mobile terminal without opening and entering the game application.

2. The method according to claim 1, before obtaining the game data, further comprising:
   receiving a plug-in operation instruction; and
   setting a correspondence relationship between the first application indicated by the plug-in operation instruction and the desktop plug-in on the mobile terminal, wherein the desktop plug-in is a plug-in built in the first application configured in an application server, or a plug-in built in a system running on the mobile terminal, or a plug-in built in a second application installed on the mobile terminal.

3. The method according to claim 1, before obtaining the game data, further comprising:
   obtaining a data operation instruction from the first application, wherein: the obtaining of the game data comprises:
   pushing, to the desktop plug-in, data indicated by the data operation instruction in the game application indicated by the data operation instruction received by the first application as the game data for display.

4. The method according to claim 1, after displaying the game data in the desktop plug-in, further comprising:
   receiving an operation instruction, wherein the operation instruction is configured to instruct an operation on the game data; and
   performing the operation instructed by the operation instruction on the game data.

5. The method according to claim 4, wherein performing the operation instructed by the operation instruction on the game data comprises at least one of:
   displaying description information of the game data on the desktop;
   switching the game application for running from a background of the mobile terminal to a foreground;
   switching a current display interface of the desktop plug-in to a following display interface, wherein the game data is displayed in multiple display interfaces of the desktop plug-in, wherein the multiple display interfaces at least comprise the current display interface and the following display interface;
   sending a verification passing information to the game application; and
   setting a reminded event used for reminding at a preset time.

6. The method according to claim 1, wherein the game data comprises at least one of:
   game data of a same game application and game data of different game applications.

7. The method according to claim 1, wherein the game data comprises at least one of:
   a health point of a currently logged-in game, social information of a current game, an opening-time reminder of a copy, game information, a game guide, a rank and an online duration of a player.

8. The method according to claim 1, further comprising:
   after displaying the activity content on the desktop of the mobile terminal, receiving a user response to the game event by detecting a direct operation on the desktop of the mobile terminal without entering the game application.

9. A data display apparatus, comprising:
   a memory, storing program instructions for a data display method, and
   a processor, coupled to the memory and, when executing the program instructions, configured to:
      obtain game data of a game application running on a mobile terminal via a first application, the game data comprising one or more of: a game event and an event time corresponding to the game event;
      provide a user interface on the mobile terminal to display the game data in a desktop plug-in corresponding to the first application, the desktop plug-in being displayed on a desktop of the mobile terminal, wherein the user interface comprises:
      a dial clock including the game data by displaying the game event on the dial clock at a position of the dial clock corresponding to the event time; and
      when the game event on the dial clock is clicked by a user, display an activity content on the desktop of the mobile terminal without opening and entering the game application.

10. The apparatus according to claim 9, wherein the processor is further configured to:
    receive a plug-in operation instruction before obtaining the game data; and
    set a correspondence relationship between the first application indicated by the plug-in operation instruction and the desktop plug-in on the mobile terminal, wherein the desktop plug-in is a plug-in built in the first application configured in an application server, or a plug-in built in a system running on the mobile terminal, or a plug-in built in a second application installed on the mobile terminal.

11. The apparatus according to claim 9, wherein the processor is further configured to:
    obtain a data operation instruction from the first application before obtaining the game data in the game application running on the mobile terminal; and
    push, to the desktop plug-in, data indicated by the data operation instruction in the game application indicated by the data operation instruction received by the first application as the game data for display.

12. The apparatus according to claim 9, wherein the processor is further configured to:

receive an operation instruction after displaying the game data in the desktop plug-in, wherein the operation instruction is configured to instruct an operation on the game data; and perform the operation instructed by the operation instruction on the game data.

13. The apparatus according to claim 12, wherein the processor is further configured to perform at least one of:

displaying description information of the game data on the desktop;

switching the game application for running from a background of the mobile terminal to a foreground;

switching a current display interface of the desktop plug-in to a following display interface, wherein the game data is displayed in multiple display interfaces of the desktop plug-in, wherein the multiple display interfaces at least comprise the current display interface and the following display interface;

sending a verification passing information to the game application; and setting a reminded event used for reminding at a preset time.

14. The apparatus according to claim 9, wherein the game data comprises at least one of:

game data of a same game application and game data of different game applications.

15. The apparatus according to claim 9, wherein the game data comprises at least one of:

a health point of a currently-logged-in game, social information of a current game, an opening-time reminder of a copy, game information, a game guide, a rank and an online duration of a player.

16. The apparatus according to claim 9, further comprising:

after displaying the activity content on the desktop of the mobile terminal, receiving a user response to the game event by detecting a direct operation on the desktop of the mobile terminal without entering the game application.

17. A non-transitory computer-readable storage medium containing computer-executable program instructions for, when executed by a processor, performing a data display method, the method comprising:

obtaining game data of a game application running on a mobile terminal via a first application, the game data comprising one or more of: a game event and an event time corresponding to the game event;

providing a user interface on the mobile terminal to display the game data in a desktop plug-in corresponding to the first application, the desktop plug-in being displayed on a desktop of the mobile terminal, wherein the user interface comprises: a dial clock including the game data by displaying the game event on the dial clock at a position of the dial clock corresponding to the event time; and when the game event on the dial clock is clicked by a user, displaying an activity content on the desktop of the mobile terminal without opening and entering the game application.

18. The storage medium according to claim 17, wherein before obtaining the game data, the method further comprises:

receiving a plug-in operation instruction; and setting a correspondence relationship between the first application indicated by the plug-in operation instruction and the desktop plug-in on the mobile terminal, wherein the desktop plug-in is a plug-in built in the first application configured in an application server, or a plug-in built in a system running on the mobile terminal, or a plug-in built in a second application installed on the mobile terminal.

19. The storage medium according to claim 17, wherein before obtaining the game data, the method further comprises:

obtaining a data operation instruction from the first application, wherein: the obtaining of the game data comprises:

pushing, to the desktop plug-in, data indicated by the data operation instruction in the game application indicated by the data operation instruction received by the first application as the game data for display.

20. The non-transitory computer-readable storage medium according to claim 17, further comprising:

after displaying the activity content on the desktop of the mobile terminal, receiving a user response to the game event by detecting a direct operation on the desktop of the mobile terminal without entering the game application.

* * * * *